(12) United States Patent
Girardeau, Jr. et al.

(10) Patent No.: US 8,781,000 B2
(45) Date of Patent: Jul. 15, 2014

(54) DYNAMIC VIDEO DATA COMPRESSION

(75) Inventors: James Ward Girardeau, Jr., Austin, TX (US); Rajat Gupta, Mississauga (CA)

(73) Assignee: ViXS Systems, Inc., Toronto, Ontario (CA)

( * ) Notice: Subject to any disclaimer, the term of this patent is extended or adjusted under 35 U.S.C. 154(b) by 306 days.

(21) Appl. No.: 12/981,708

(22) Filed: Dec. 30, 2010

(65) Prior Publication Data

US 2012/0170667 A1    Jul. 5, 2012

(51) Int. Cl.
*H04N 7/12* (2006.01)
*H04N 7/50* (2006.01)
*H04N 7/26* (2006.01)

(52) U.S. Cl.
CPC .............. *H04N 7/50* (2013.01); *H04N 7/26335* (2013.01); *H04N 7/26707* (2013.01); *H04N 7/26946* (2013.01); *H04N 7/26244* (2013.01)
USPC ............ 375/240.25; 375/240.01; 375/240.26; 375/240.27; 375/240.28; 375/240.29

(58) Field of Classification Search
CPC . H04N 7/50; H04N 7/26335; H04N 7/26244; H04N 7/26707; H04N 7/26755
USPC ............... 375/240.25, 240.1, 240.26–240.29; 348/488
See application file for complete search history.

(56) References Cited

U.S. PATENT DOCUMENTS

| | | | | |
|---|---|---|---|---|
| 5,129,015 A | * | 7/1992 | Allen et al. | 382/167 |
| 5,495,291 A | * | 2/1996 | Adams | 375/240.25 |
| 5,574,503 A | * | 11/1996 | May | 375/240.12 |
| 5,675,333 A | * | 10/1997 | Boursier et al. | 341/87 |
| 5,806,068 A | * | 9/1998 | Shaw et al. | 1/1 |
| 5,892,545 A | * | 4/1999 | Saunders et al. | 348/390.1 |
| 5,909,638 A | * | 6/1999 | Allen | 725/146 |
| 5,945,933 A | * | 8/1999 | Kalkstein | 341/63 |
| 6,018,548 A | * | 1/2000 | Kanevsky | 375/241 |
| 6,067,125 A | * | 5/2000 | May | 348/607 |
| 6,208,273 B1 | * | 3/2001 | Dye et al. | 341/51 |
| 6,353,700 B1 | * | 3/2002 | Zhou | 386/353 |
| 6,490,109 B1 | * | 12/2002 | Ushirogi | 360/48 |

(Continued)

OTHER PUBLICATIONS

Aho, Eero et al., "A Case for Multi-Channel Memories in Video Recording," Europe Conference & Exhibition on Design, Automation & Test, Apr. 20-24, 2009, pp. 934-939, 6 pages.

(Continued)

*Primary Examiner* — Andy Rao
*Assistant Examiner* — Shan Elahi
(74) *Attorney, Agent, or Firm* — Abel Law Group, LLP

(57) ABSTRACT

A method includes decompressing first compressed video data to provide uncompressed video data in a first order. The method includes compressing the uncompressed video data to provide second compressed video data in a second order. The decompressing and compressing are based on first and second compression rates, respectively. The first order may be based on fundamental blocks of a frame of video data and the second order is based on lines of the frame of video data. The compressing may include alternating compression of partial portions of a first line of uncompressed video data with compression of partial portions of at least a second line of uncompressed video data to thereby generate a first line of compressed video data corresponding to the first line of uncompressed video data and at least a second line of compressed video data corresponding to the second line of uncompressed video data.

27 Claims, 7 Drawing Sheets

(56) References Cited

U.S. PATENT DOCUMENTS

| | | | |
|---|---|---|---|
| 6,822,589 B1* | 11/2004 | Dye et al. | 341/51 |
| 6,879,266 B1* | 4/2005 | Dye et al. | 341/51 |
| 6,909,436 B1* | 6/2005 | Pianykh et al. | 345/619 |
| 6,941,019 B1* | 9/2005 | Mitchell et al. | 382/232 |
| 6,985,589 B2* | 1/2006 | Morley et al. | 380/269 |
| 6,988,114 B2* | 1/2006 | Sirtori et al. | 708/203 |
| 7,024,045 B2* | 4/2006 | McIntyre | 382/239 |
| 7,129,860 B2* | 10/2006 | Alvarez et al. | 341/51 |
| 7,876,252 B1* | 1/2011 | Wegener | 341/155 |
| 8,054,879 B2* | 11/2011 | Fallon et al. | 375/240 |
| 8,073,047 B2* | 12/2011 | Fallon et al. | 375/240 |
| 8,553,759 B2* | 10/2013 | Fallon et al. | 375/240 |
| 8,605,048 B2* | 12/2013 | Ye et al. | 345/173 |
| 8,631,055 B2* | 1/2014 | Wegener | 708/203 |
| 2001/0038642 A1* | 11/2001 | Alvarez et al. | 370/477 |
| 2001/0054131 A1* | 12/2001 | Alvarez et al. | 711/105 |
| 2002/0009235 A1* | 1/2002 | Schwartz et al. | 382/244 |
| 2002/0056081 A1* | 5/2002 | Morley et al. | 725/1 |
| 2002/0101442 A1* | 8/2002 | Costanzo et al. | 345/723 |
| 2002/0152247 A1* | 10/2002 | Sirtori et al. | 708/203 |
| 2003/0039398 A1* | 2/2003 | McIntyre | 382/239 |
| 2003/0103523 A1* | 6/2003 | Frossard et al. | 370/465 |
| 2003/0138158 A1* | 7/2003 | Schwartz | 382/240 |
| 2003/0206635 A1* | 11/2003 | Morley et al. | 380/269 |
| 2004/0193289 A1* | 9/2004 | Chen et al. | 700/3 |
| 2005/0094967 A1* | 5/2005 | Hatalsky et al. | 386/52 |
| 2005/0135619 A1* | 6/2005 | Morley et al. | 380/217 |
| 2005/0226324 A1* | 10/2005 | Ouyang et al. | 375/240.12 |
| 2006/0039473 A1* | 2/2006 | Filippini et al. | 375/240.16 |
| 2006/0218512 A1* | 9/2006 | Arslan et al. | 716/4 |
| 2006/0291736 A1* | 12/2006 | Hou | 382/250 |
| 2007/0035706 A1* | 2/2007 | Margulis | 353/122 |
| 2008/0304563 A1* | 12/2008 | Schoenblum | 375/240.03 |
| 2010/0027819 A1* | 2/2010 | Van Den Berghe et al. | 381/302 |
| 2010/0111162 A1* | 5/2010 | Ramachandran | 375/240.01 |
| 2010/0220215 A1* | 9/2010 | Rubinstein et al. | 348/231.99 |
| 2011/0078222 A1* | 3/2011 | Wegener | 708/203 |
| 2011/0235720 A1* | 9/2011 | Banterle et al. | 375/240.25 |
| 2012/0113029 A1* | 5/2012 | Ye et al. | 345/173 |
| 2012/0170667 A1* | 7/2012 | Girardeau et al. | 375/240.25 |

OTHER PUBLICATIONS

Cornell University, "Table: Attributes for Common Compression Techniques," 2000-2002, 1 page, downloaded Sep. 22, 2010 from URL: <http://www.library.cornell.edu/preservation/tutorial/presentation/table7-3.html>.

Jentz, Brian, "Low-Cost Solutions for Video Compression Systems," Altera Corporation, 2005, 5 pages.

Jaspers, Egbert G.T. and De With, Peter H.N., "Embedded Compression for Memory Resource Reduction in MPEG Systems," Proc. 3rd IEEE Benelux Signal Processing Symposium (SPS-2002), Mar. 21-22, 2002, 4 pages.

Janssen, Johan G., "System Architecture and Applications of the PNX5100—A high-performance full HD 120p Hz post-processing engine," Philips NXP tutorial, presented Aug. 24-26, 2008, HotChips 20 (2008), Memorial Auditorium, Stanford University, 27 pages, downloaded Sep. 29, 2010 from URL: <http://www.hotchips.org/archives/hc20/2_Mon/HC20.25.231.pdf>.

Srinivasan, Krishnan and Salminen, Erno, "A Methodology for Performance Analysis of Network-on-Chip Architectures for Video SoC," D&R Industry Articles, 6 pages, downloaded Sep. 22, 2010 from URL: <http://www.design-reuse.com/articles/?id=20623&print=yes>.

Wikipedia, "Digital Video," 9 pages, downloaded Sep. 22, 2010 from URL: <http://en.wikipedia.org/wiki/Digital_video>.

Wikipedia, "Video Compression," 5 pages, downloaded Sep. 22, 2010 from URL: <http://en.wikipedia.org/wiki/Video_compression>.

Wikipedia, "Data Compression," 8 pages, downloaded Sep. 22, 2010 from URL: <http://en.wikipedia.org/wiki/Compression_algorithm>.

Wikipedia, "Data Compression," 8 pages, downloaded Sep. 22, 2010 from URL: <http://en.wikipedia.org/wiki/Data_compression>.

* cited by examiner

DYNAMIC VIDEO DATA COMPRESSION

BACKGROUND

1. Field of the Invention

This application is related to data processing systems and more particularly to video data processing systems.

2. Description of the Related Art

A typical video data processing system includes an off-chip, system memory and a video system-on-a-chip (SOC) integrated circuit including multiple video processing blocks and related hardware. The video SOC receives compressed video data and decompresses (i.e., decodes, uncompresses, or expands) the compressed video data to recover uncompressed (i.e., raw) video data. The video SOC writes the uncompressed video data to the system memory for subsequent use by one or more video processing blocks. The one or more video processing blocks retrieve the uncompressed video data and may write processed, uncompressed video data back to memory. In general, a video image includes R×C pixels (e.g., 1920×1080 for an exemplary high-definition video screen) and each pixel may be represented by multiple bytes of data. Due to the large quantity of data involved, a full frame of video data of a video image is not typically available to a particular video processing block at a particular time. Rather, portions of the frame of video data are read from system memory, processed incrementally, and, in some cases, written back to memory.

Movement of uncompressed video data between the system memory and the video SOC consumes substantial memory bandwidth. Typically, the memory bandwidth available to the video SOC limits performance of the video processing system. Increases to the system memory (e.g., by increasing the number of memory channels), which may increase the available memory bandwidth, introduce substantial additional costs to the video SOC (e.g., by increasing the size of on-chip buffers, controllers, number of pins, and board area), increases the cost of external memory, and ultimately increases the cost of the video processing system.

SUMMARY

In at least one embodiment of the invention, a method includes decompressing first compressed video data to provide uncompressed video data in a first order. The decompressing is based on a first compression rate. The method includes compressing the uncompressed video data to provide second compressed video data in a second order. The compressing is based on a second compression rate. In at least one embodiment of the method, the first order is based on fundamental blocks of a frame of video data and the second order is based on lines of the frame of video data. In at least one embodiment of the method, the compressing includes alternating compression of partial portions of a first line of uncompressed video data with compression of partial portions of at least a second line of uncompressed video data to thereby generate a first line of compressed video data corresponding to the first line of uncompressed video data and at least a second line of compressed video data corresponding to the second line of uncompressed video data.

In at least one embodiment of the invention, an apparatus includes a buffer, a first video data decompressor, and a video data compressor. The first video data decompressor is operative to decompress first compressed video data based on a first compression rate and to write uncompressed video data to the buffer in a first order. The video data compressor is operative to read the uncompressed video data from the buffer and to provide second compressed video data in a second order. In at least one embodiment, the video data compressor is operative to alternate compression of partial portions of a first line of uncompressed video data with compression of partial portions of at least a second line of uncompressed video data to thereby generate a first line of compressed video data corresponding to the first line of uncompressed video data and at least a second line of compressed video data corresponding to the second line of uncompressed video data. In at least one embodiment, the video data compressor is operative to save state information of the video data compressor after compressing a first portion of the first line of uncompressed video data and operative to restore the state information to the video data compressor before compressing a second portion of the first line of the uncompressed video data. In at least one embodiment of the apparatus, the first order is based on fundamental blocks of a frame of video data and the second order is based on lines of the frame of video data. In at least one embodiment, the apparatus includes a memory comprising an expansion portion. The memory is operative to store lines of video data larger than corresponding uncompressed lines of video data.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
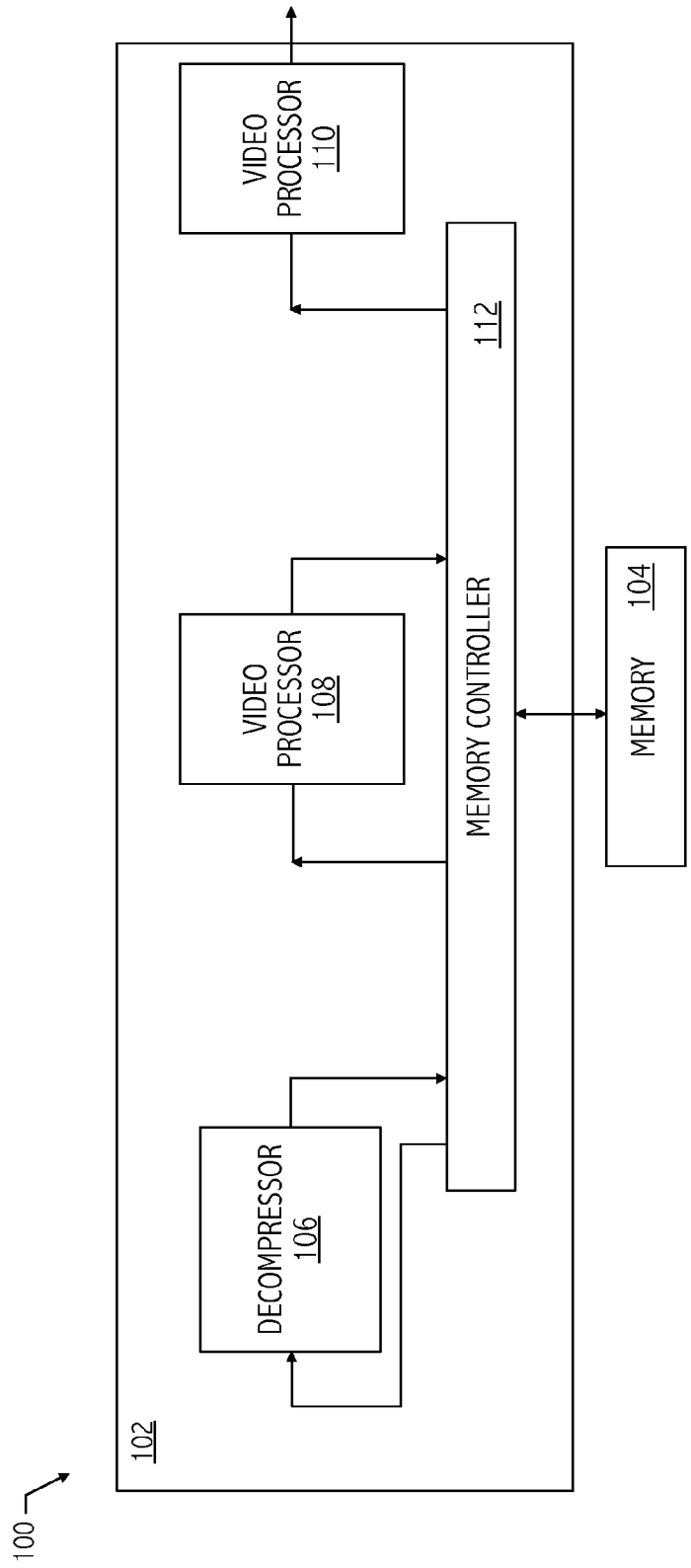
FIG. 1 illustrates a functional block diagram of an exemplary video processing system including storage of uncompressed video data.

Referring to FIG. 1, an exemplary video system-on-a-chip (SOC) integrated circuit (e.g., video SOC 102) receives one or more streams of video data from an external source via memory 104. For example, the external source writes highly compressed video data to memory 104. The highly compressed video data is video data compressed by an encoder having a high compression rate. As referred to herein, a high compression rate is a compression rate of at least approximately 10×, i.e., the compressed video data uses at least approximately 10 times fewer bits than the uncompressed (i.e., raw) video data. For example, a Moving Picture Experts Group (MPEG) video compression standard has a compression rate of approximately 25-60×. A typical decompressor (i.e., decoder or expander, e.g., decompressor 106) decompresses the video data and provides the uncompressed video data to memory controller 112 to write the uncompressed video data to memory 104. Decompressor 106 (e.g., an MPEG standard compliant decoder) requires a large latency to decompress video data. Video processors 108 and 110 retrieve the uncompressed video data from memory 104. Video processors 108 and 110 retrieve only portions of an individual frame of the video data at a time. Video processors 108 and 110 may include one or more of a frame rate converter, a display, a deinterlacer, compositor, a scaler, a sharpener, a color manipulation block, a face or objection recognition block, a contrast enhancer, a superresolution scaler, a deblocker, a temporal and/or spatial noise reducer, other suitable video processing blocks, or any combination thereof. Video processors 108 and 110 store processed, uncompressed video data back to memory 104 for subsequent use or provide processed video data to an off-chip circuit (not shown).

Although decompressor 106 and video processors 108 and 110 are illustrated as being directly coupled to memory controller 112, in other embodiments of an SOC, decompressor 106 and video processors 108 and 110 are coupled to one or more shared memory buses. A typical memory 104 is a double data rate synchronous dynamic random access memory (i.e., DDR SDRAM memory or DDR memory). In at least one embodiment, memory 104 is a DDR memory compliant with a DDR SDRAM memory standard, DDR2 SDRAM memory standard, DDR3 SDRAM memory standard, other DDR SDRAM memory standard, or other suitable memory standard. Although described with reference to a DDR SDRAM memory, techniques described herein are applicable to systems including memory compliant with other memory standards.

In general, improvements to memory bandwidth efficiency of video processing system 100 may be applied to increase functionality of video processing system 100 and/or applied to reduce the cost of video processing system 100. For example, improvements to memory bandwidth efficiency of video processing system 100 allow memory 104 to be downsized, e.g., from a DDR memory with a 32-bit bus (i.e., x32 DDR memory) to a DDR memory with a 16-bit bus (i.e., x16 DDR memory). The downsized memory 104 reduces the number of required pins, board area, video SOC die area, external memory cost, and ultimately, cost of video processing system 100. In addition, improvements to memory bandwidth efficiency of video processing system 100 may facilitate an increase to the number of high-definition video streams being processed concurrently by video processing system 100.

Figure 2:
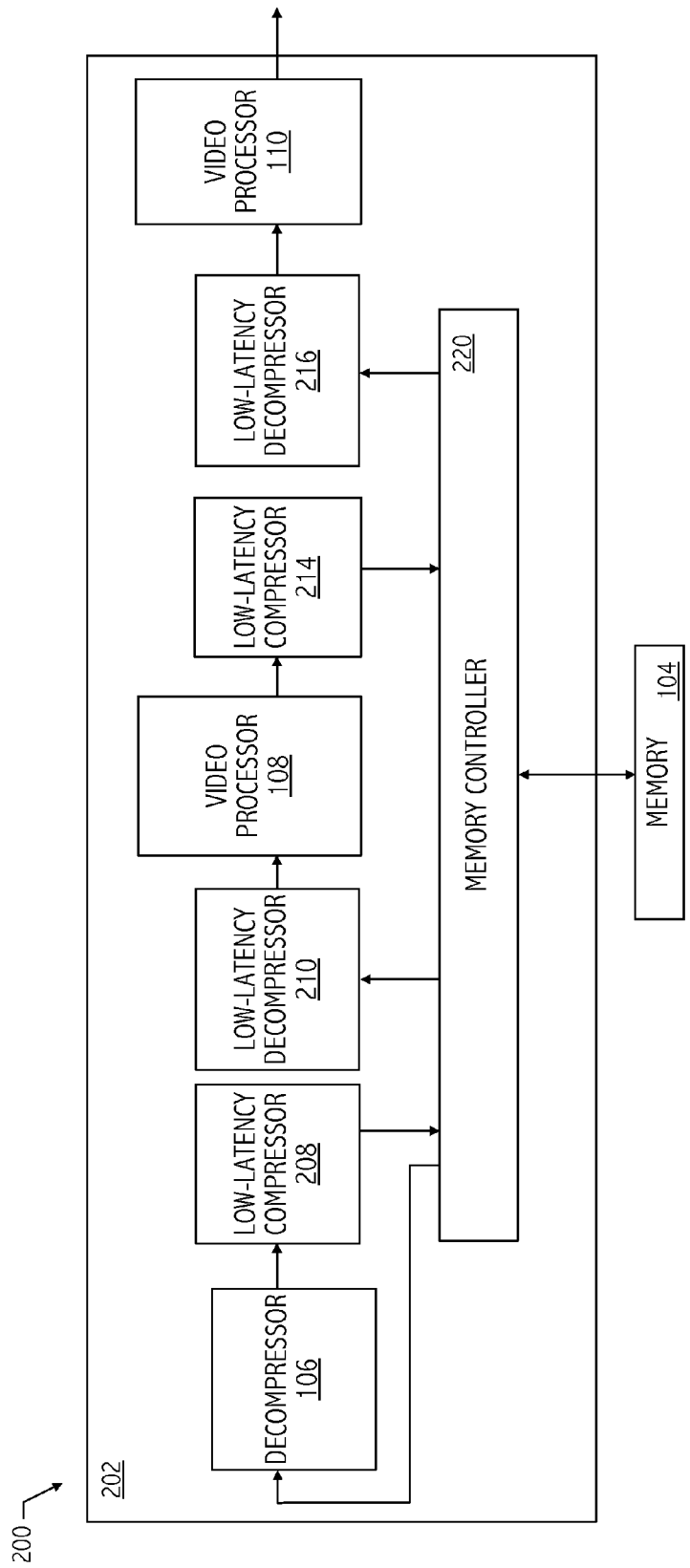
FIG. 2 illustrates a functional block diagram of an exemplary video processing system implementing an exemplary dynamic video data compression technique.

Referring to FIG. 2, video processing system 200 includes an exemplary video SOC (e.g., video SOC 202) implementing a dynamic video data compression technique that improves memory bandwidth efficiency of video processing system 200 as compared to the memory bandwidth efficiency of video processing system 100. Decompressor 106 retrieves highly compressed video data from memory 104 and provides uncompressed video data to a low-latency compressor (i.e., encoder, e.g., low-latency compressor 208). Low-latency compressor 208 provides compressed data to be stored in memory 104 via memory controller 220. Low-latency compressor 208 compresses the raw video data with a low latency (i.e., at least one order of magnitude less than a high compression rate compressor, e.g., a few cycles of a system clock) and using a lower compression rate than the compression rate of the highly compressed video data. Exemplary low-latency compression techniques include run length codes, or other suitable low-latency compression techniques, which may be lossy or lossless compression techniques, or a combination thereof. In at least one embodiment, low-latency compressor 208 replaces each pixel after a first pixel with a difference between the pixel and a pixel neighboring that pixel on the left. The resulting values are then compressed, for example, using at least one of Huffman coding and sliding window compression (e.g., LZ77 compression). In at least one embodiment, low-latency compressor 208 uses a discrete wavelet transform technique that calculates a sum and a difference of neighboring pairs of pixels. If lossy, low-latency compression is enabled, difference values are discarded if certain conditions are satisfied. Then, the remaining values are compressed, e.g., using at least one of Huffman coding and sliding window compression.

In at least one embodiment of the dynamic video data compression technique, a high-compression video data compression technique associated with decompressor 106 has a compression rate that is at least an order of magnitude greater than the rate of the low-latency video data compressor 208. For example, low-latency compressor 208 may reduce the number of bits of the video data by a factor of two and a high-compression rate video data compression technique reduces the number of bits of the video data by a factor of 25 or more. The reduction by a factor of two in memory bandwidth usage provided by the dynamic video compression technique of video SOC 202 can dramatically increase the throughput of video SOC 202 as compared to the throughput of video SOC 102. In at least one embodiment, SOC 202 is able to process an additional stream of video data as compared to the number of video streams processed by video SOC 102. In at least one embodiment, low-latency compressor 208 compresses the uncompressed video data provided by decompressor 106 in the same order that it is received from decompressor 106. Low-latency compressor 208 provides the compressed video data to memory controller 220 in the same order that it is compressed. Similarly, low-latency decompressors 210 and 214 decompress compressed video data in the same order that the compressed video data is received from memory controller 220 in response to a video data request from video processors 108 and 110, respectively. However, in at least one embodiment, decompressor 106 provides uncompressed data in an order different from the order that video processor 108 or video processor 110 processes the video data. For example, decompressor 106 may provide uncompressed video data in tiles of fundamental blocks of video data and video processor 108 processes lines of a frame of uncompressed video data at a time. If video data is compressed in the order that decompressor 106 provides it (e.g., non-linear, tiled order) and subsequent video processing blocks (e.g., scaler) read uncompressed data line-by-line of a frame of screen data (i.e., linear order), low-latency decompressor 210 may not be able to decompress the compressed video data with a low enough latency to prevent starvation (i.e., lack of data, when needed) of those subsequent video processor blocks.

Figure 3:
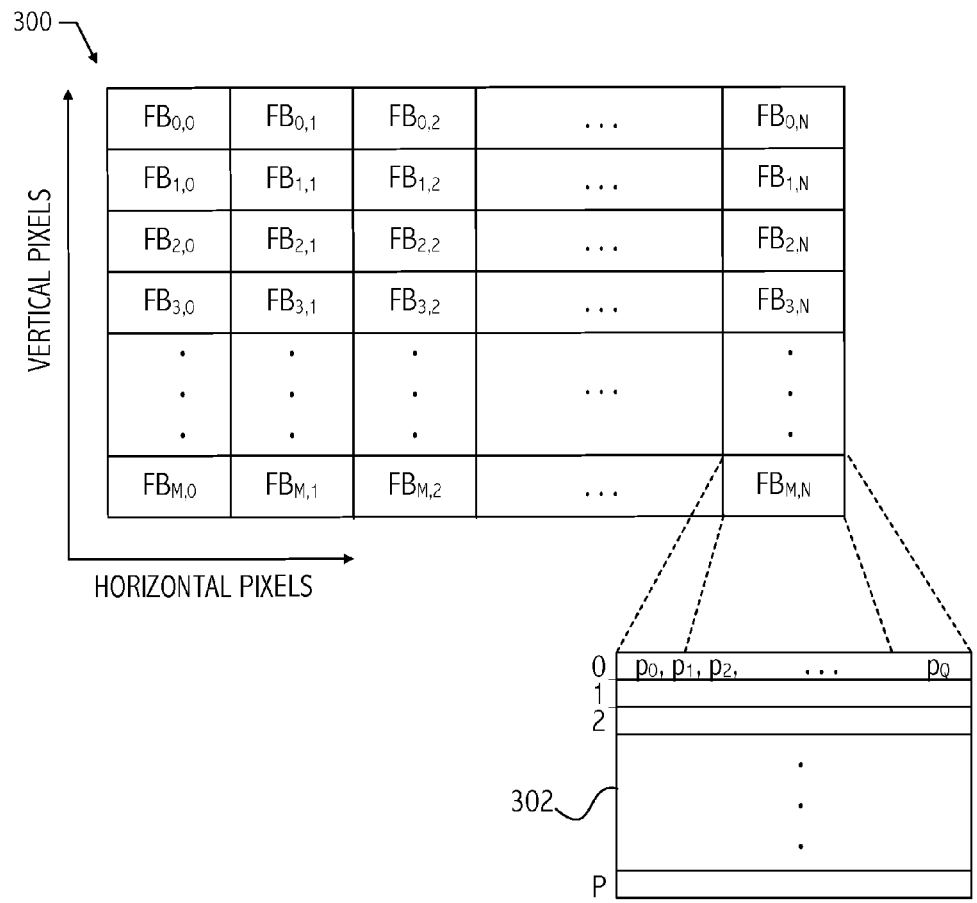
FIG. 3 illustrates an exemplary video data format of a frame of a screen image.

Referring to FIGS. 1 and 3, in at least one embodiment of video SOC 102, the compressed video data received from the external source is compressed using a high compression rate video data compression technique (e.g., MPEG-2) that partitions a frame of a video image (e.g., frame 300) into M rows and N columns of fundamental blocks (e.g., macroblocks) of pixels. An individual fundamental block is represented by $FB_{m,n}$, where m indicates a particular row of the M rows of fundamental blocks of frame 300 and n indicates a particular column of the N columns of fundamental blocks of frame 300. In at least one embodiment of video SOC 102, each fundamental block (e.g., fundamental block 302) includes a P×Q block of pixel data (i.e., each fundamental block includes P lines of Q pixels, e.g., a 16×16 block of pixel data). Each row of the fundamental block includes pixels forming a portion of a line of a frame of a video image. For example, where the number of fundamental blocks that span a line of a frame of the video image is N, each row of a fundamental block includes a line portion of pixels forming 1/Nth of a line of the frame of the video image. Decompressor 106 operates on the video data in a non-linear manner, i.e., not line-by-line of the frame of the video image. In at least one embodiment, decompressor 106 operates on fundamental blocks of the frame of the video image, and provides the uncompressed video data in a tiled format (i.e., fundamental block by fundamental block of uncompressed video data). In at least one embodiment, decompressor 106 writes a fundamental block at a time, from left-to-right, top-to-bottom of a frame of a video image, with pixels within the block being written in a linear order. However, note that each fundamental block may include video data corresponding to multiple lines. In addition, note that tiling formats and fundamental block sizes may vary with different high-compression rate video compression techniques and decoders compliant with different video compression standards.

Figure 4:
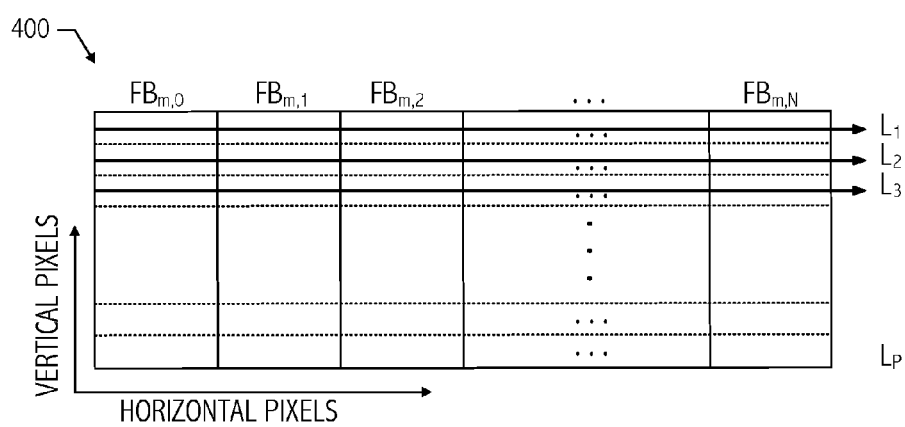
FIG. 4 illustrates an information flow of exemplary video data of a screen image to a video processing block of an SOC.

Referring to FIG. 4, in at least one embodiment of SOC 102, video processors 108 and 110 process video data in a linear manner, i.e., read or operate on frames of a video image line-by-line. In one row of fundamental blocks of a frame of a video image (e.g., row 400) the number of lines read and processed can be unrelated to the size of the fundamental block. For example, an exemplary video processor may operate on three lines of that row of fundamental blocks at a time (e.g., $L_1$, $L_2$, $L_3$). However, the row of fundamental blocks includes P lines of video data (e.g., $L_1$, $L_2$, $L_3$, ..., $L_P$) and each fundamental block includes P line portions corresponding to the P lines of video data (e.g., $l_{m,n,1}$, $l_{m,n,2}$, $l_{m,n,3}$, ..., $l_{m,n,P}$), where m indicates a row of fundamental blocks of a frame of a video image and n indicates a column of fundamental blocks of the screen image. The exemplary video processing block reads and processes one or more lines of video data, each line including portions of video data from multiple fundamental blocks that span a row of a frame of a video image (e.g., each line spans N fundamental blocks). Note that in at least one embodiment, an exemplary video processor reads and processes a number of lines that is not a multiple of the number of lines included in a fundamental block. Accordingly, when the video processor reads multiple lines, those lines may span multiple fundamental blocks of a frame of a video image in different rows of the frame of the video image (i.e., spanning vertically adjacent portions of the frame of the video image).

Figure 5:
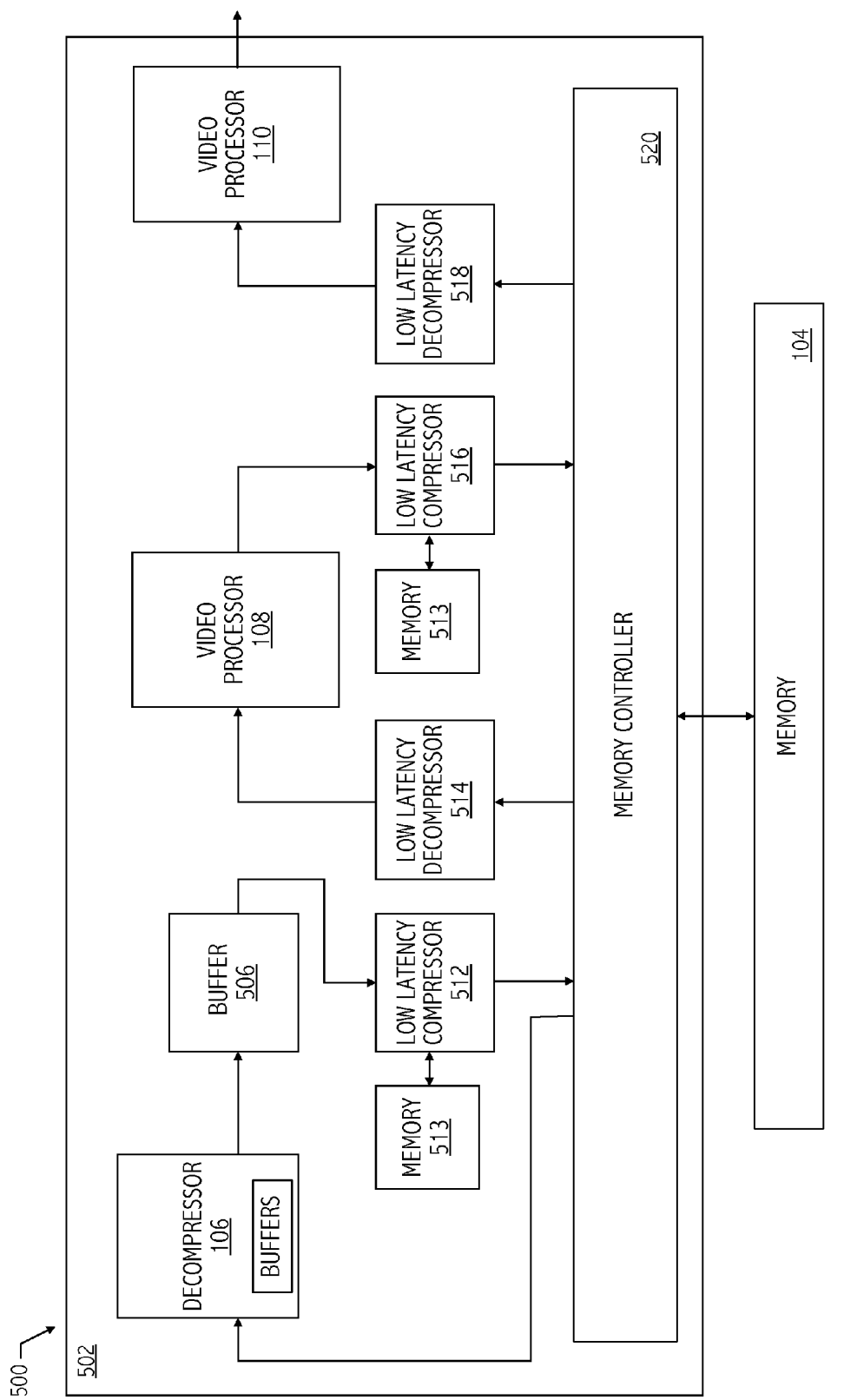
FIG. 5 illustrates a functional block diagram of an exemplary video processing system implementing an exemplary dynamic video data compression technique consistent with at least one embodiment of the invention.

The above-described disparity between the order in which an embodiment of decompressor 106 produces uncompressed video data and the order in which video processors 108 and 110 consume the uncompressed video data increases the complexity of dynamic low-latency compression and decompression of video data. Referring to FIGS. 2 and 5, rather than providing the uncompressed video data to memory controller 112 to be stored in memory 104 or to low-latency compressor 208 of FIG. 2, in at least one embodiment of a video SOC (e.g., video SOC 502 of FIG. 5), decompressor 106, which is consistent with a high compression rate compression technique, writes one or more fundamental blocks of the uncompressed video data to a buffer circuit (e.g., buffer 506 of FIG. 5) on the video SOC.

Referring to FIG. 5, in at least one embodiment, video SOC 502 implements an internal buffer (e.g., buffer 506) in an on-chip cache memory or other suitable storage circuit. Decompressor 106 writes each fundamental block of uncompressed video data to buffer 506, as it becomes available. In at least one embodiment, buffer 506 includes multiple buffer portions (e.g., buffer 506 is a ping-pong buffer or rotating buffer) to allow low-latency compressor 512 to access at least one complete fundamental block of uncompressed video data at a time, rather than accessing partially updated fundamental blocks of uncompressed video data. Meanwhile, decompressor 106 writes next fundamental blocks of uncompressed video data to another portion of buffer 506.

In at least one embodiment, decompressor 106 provides to buffer 506 fundamental blocks of a frame of a video image from left to right, top to bottom of the frame of the video image, i.e., $FB_{0,0}$, $FB_{0,1}$, $FB_{0,2}$, ... $FB_{0,N}$, $FB_{1,0}$, $FB_{1,1}$, $FB_{1,2}$, ... $FB_{1,N}$, $FB_{2,0}$, $FB_{2,1}$, $FB_{2,2}$, ... $FB_{2,N}$, ... $FB_{M,0}$, $FB_{2,1}$, $FB_{2,2}$, ... $FB_{M,N}$. In at least one embodiment of video SOC 502, decompressor 106 is one of several decompressors 106 associated with high compression rate data (e.g., HD H.264 AVC, HD VC-1, and HD MPEG2) on a single video SOC 502. Each decompressor on video SOC 102 may have a unique fundamental block size and/or tiling algorithm. Low-latency compressor 512 reads the uncompressed video data from buffer 506, compresses the uncompressed video data, and provides complete lines of compressed video data to memory controller 520 to be written to memory 104. Low-latency compressor 512 compresses the raw video data with a low latency (i.e., at least one order of magnitude less than a high compression rate compressor, e.g., a few cycles of a system clock) and using a lower compression rate than the compression rate of the highly compressed video data. A high-compression video data compression technique associated with decompressor 106 has a compression rate that is at least an order of magnitude greater than the rate of the low-latency video data compressor 512.

Figure 6:
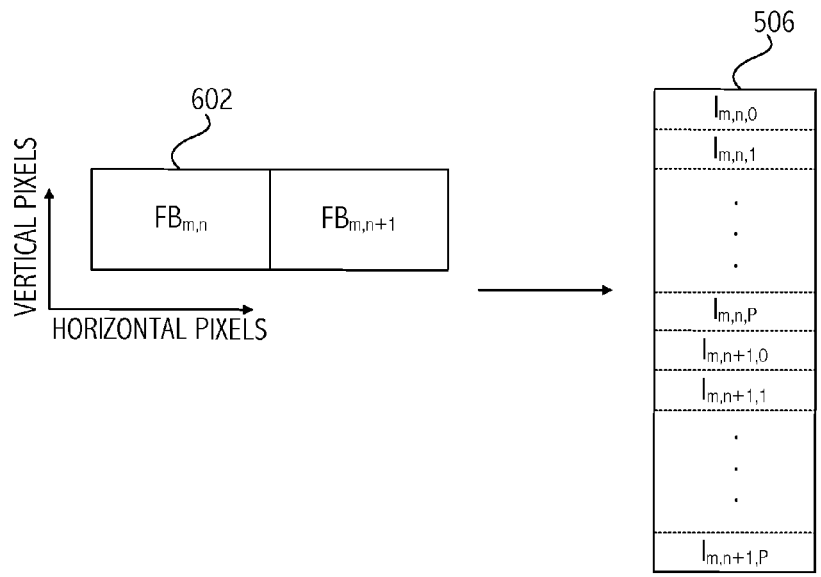
FIG. 6 illustrates an information flow of fundamental blocks of uncompressed video data from decompressor 106 to buffer 506 of FIG. 5, consistent with at least one embodiment of the invention.

Referring to FIGS. 5 and 6, in at least one embodiment, decompressor 106 writes fundamental blocks of uncompressed video data 602 into buffer 506 in the order they become available. For example, lines of a fundamental block at row m and column n (i.e., $FB_{m,n}$), of a frame of a video image are written line portion by line portion into buffer 506, i.e., $l_{m,n,0}$, $l_{m,n,1}$, ... $l_{m,n,P}$. In at least one embodiment, buffer 506 can hold at least one additional fundamental block (e.g., $FB_{m,n+1}$), which is written in line order, i.e., $l_{m,n+1,0}$, $l_{m,n+1,1}$, ..., $l_{m,n+1,P}$. Thus, buffer 506 provides one or more fundamental blocks of uncompressed video data to low-latency compressor 512 at a particular time.

Figure 7:
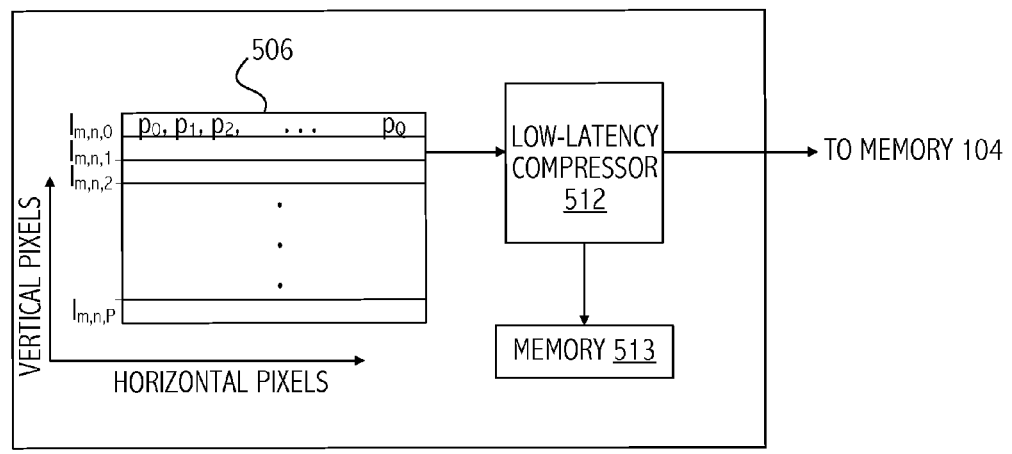
FIG. 7 illustrates an information flow of uncompressed video data from buffer 506 to low-latency compressor 512 of FIG. 5 consistent with at least one embodiment of the invention.

Referring to FIG. 7, in at least one embodiment, low-latency compressor 512 reads a first row (e.g., $l_{m,n,0}$) from buffer 506, which contains one fundamental block of data (i.e., $FB_{m,n}$). Low-latency compressor 512 compresses that line of the fundamental block. Since a line of a frame of video data is distributed across multiple fundamental blocks of video data that each contain a portion of the line, low-latency compressor 512 saves (e.g., in on-chip memory 513 or other storage element) the state of the low-latency compressor after compressing a line of the fundamental block corresponding to a portion of a first line of a frame of video data. Low-latency compressor 512 saves that state information for later compression of additional portions of that line that are provided in additional fundamental blocks that span that line of the frame of video data.

In at least one embodiment, after saving the state information, the state of low-latency compressor 512 is reset and low-latency compressor 512 reads a next row from buffer 506 (e.g., $l_{m,n,0}$), which corresponds to a second line portion of the fundamental block and a next line of a frame of video data. Compressor 512 saves the resulting state of the compressor. In at least one embodiment, low-latency compressor 512 continues compressing next rows from buffer 506 and saving the resulting state until the end of the buffer portion for a buffer storing only one fundamental block. Then, compressor 512 restores the stored state corresponding to the first line of the frame of video data and compresses a next portion of the first line of the frame of video data (e.g., $l_{m,n+1,0}$) from a next fundamental block of uncompressed data (i.e., $FB_{m,n+1}$), which either overwrites $FB_{m,n}$ or is retrieved from another buffer portion of buffer 506. Low-latency compressor 512 continues restoring state information from memory 513, compressing next rows from buffer 506, and saving the resulting state until all line portions of individual lines being processed have been compressed.

Referring back to FIG. 5, decompressor 106 continues to overwrite contents of buffer 506 with fundamental blocks of uncompressed video data. Meanwhile, low-latency compressor 512 continues to save states of the compressor as intermediate states of the compression of lines of frames of video data and continues to restore states of the compressor to compress next portions of lines of frames of video data. Low-latency compressor 512 continues alternating between compression of different lines of a frame of video data until entire lines of a frame of video data are compressed. Each fundamental block line that forms a portion of a line of a frame of video data is compressed to form a complete line of compressed video data. Then, low-latency compressor 512 sends the complete line of compressed video data to memory controller 520 to be written to memory 104. In at least one embodiment, low-latency compressor 512 buffers the complete lines of compressed video data until the buffer includes enough compressed video data to satisfy a minimum burst requirement of memory controller 520 and/or memory 104. In response to satisfying the minimum burst requirement, memory controller 520 sends the corresponding lines of compressed video data to memory 104.

Figure 8:
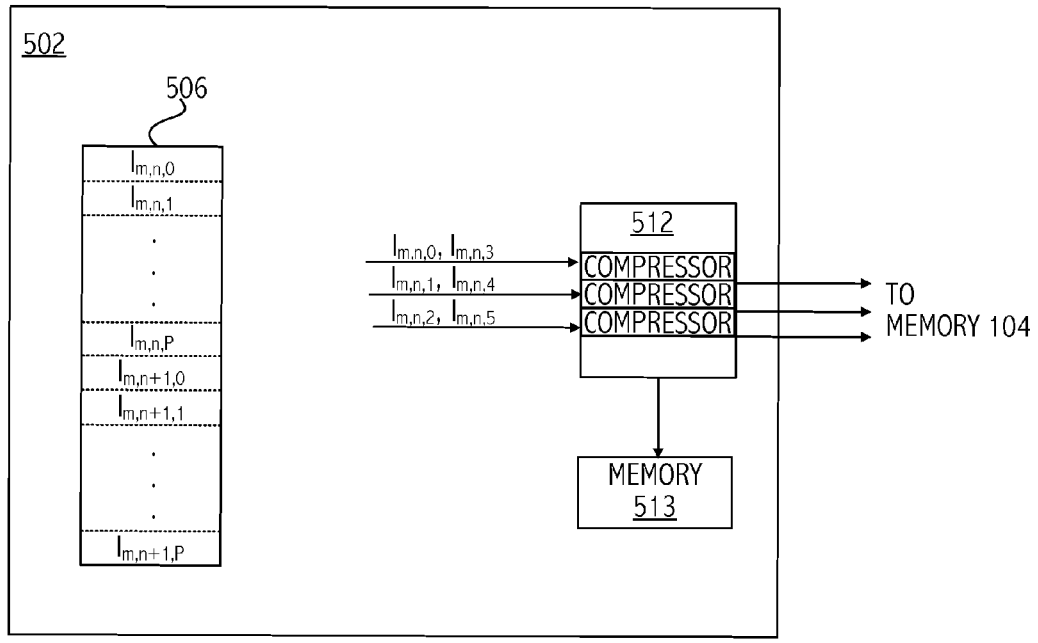
FIG. 8 illustrates an information flow of uncompressed video data from buffer 506 to low-latency compressor 512 of FIG. 5 consistent with at least one embodiment of the invention.

Referring to FIGS. 5 and 8, in at least one embodiment, low-latency compressor 512 includes multiple parallel compressor blocks capable of compressing multiple lines of video data concurrently. Each of the compressor blocks processes a row from buffer 506 and saves the resulting compressor block state until the end of the buffer portion for a buffer storing only one fundamental block. Then, compressor 512 restores the stored states corresponding to the first lines of the frame of video data compressed by the compressor blocks and compresses next portions of those lines from next fundamental blocks of uncompressed data (i.e., $FB_{m,n+1}$). Low-latency compressor 512 continues restoring state information from memory 513, compressing next rows from buffer 506, and saving the resulting state until all line portions of individual lines being processed have been compressed. In at least one embodiment, buffer 506 includes multiple fundamental blocks of uncompressed video data (i.e., $FB_{m,n}$ and $FB_{m,n+1}$). Low-latency compressor 512 compresses individual rows from buffer 506 and saves the resulting compressor block states until next rows from buffer 506 include next portions of the lines from the next fundamental block of uncompressed data. Then, compressor 512 restores the stored states corresponding to the individual lines of the frame of video data to the compressor blocks and compresses next line portions of the corresponding lines of the frame of video data. Low-latency compressor 512 continues alternating compression of partial portions of individual lines of uncompressed video until the compressors have completed compression of corresponding lines of video data.

Figure 9:
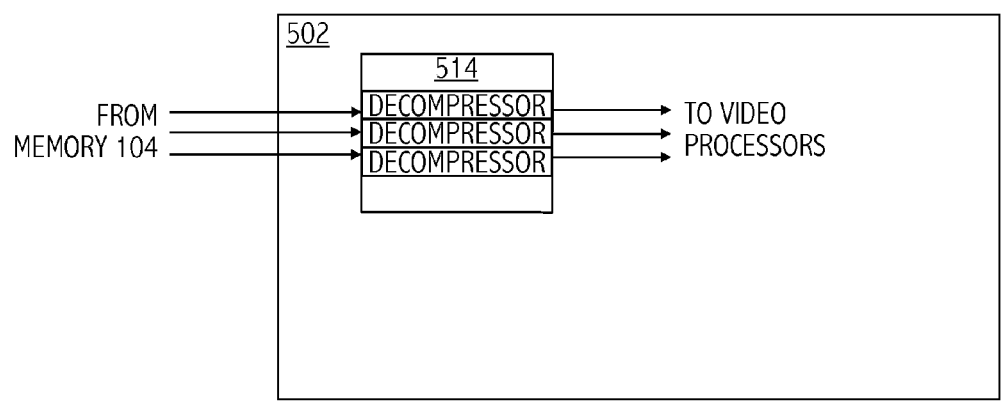
FIG. 9 illustrates an information flow of compressed video data from system memory to one or more low-latency decompressors of FIG. 5 consistent with at least one embodiment of the invention.

Referring to FIGS. 5 and 9, when video processor 108 or video processor 110 requires input video data, the video processor sends a request for video data to memory controller 520. Memory controller 520 retrieves the compressed video data from memory 104 and provides the compressed video data to low-latency decompressor 514. Low-latency decompressor expands at least one line of the compressed data at a time and provides the uncompressed video data to the video processor. In at least one embodiment, low-latency decompressor 514 includes multiple decompressors that expand lines of a frame of video data in parallel, allowing decompressor 514 to provide, concurrently, multiple lines of uncompressed video data to video processor 110.

Referring to FIG. 5, in at least one embodiment of video SOC 502, separate low-latency compressor and decompressor blocks (e.g., compressor 512, decompressor 514, compressor 516, and decompressor 518) are included to facilitate use of existing designs for decompressor 106, and video processors 108 and 110. The separate low-latency compressor and decompressor blocks make the dynamic video data compression technique transparent to those video data processing blocks. In at least one embodiment of video SOC 502, the low-latency compressor and decompressor functions are integrated into memory controller 520. In other embodiments of video SOC 502, the low-latency compression and decompression functions are integrated into decompressor 106 and video processors 108 and 110.

Figure 10:
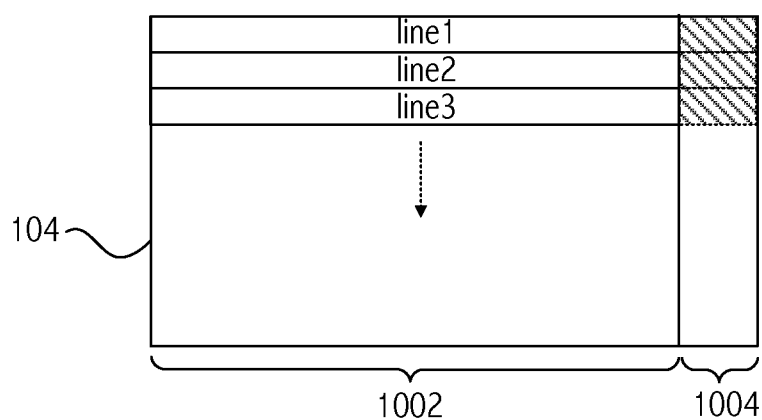
FIG. 10 illustrates a system memory of FIG. 5 including a guard band consistent with at least one embodiment of the invention.

In at least one embodiment, video SOC 502 allocates memory sufficient to accommodate a number of lines of video data based on the width of a line of uncompressed video data. Typical low-latency compressed lines of video data occupy approximately ⅓ to approximately ½ of the uncompressed lines of video data. However, in at least one embodiment of video SOC 502, a low-latency compression technique may generate a line of compressed video data that is larger than a corresponding line of uncompressed video data, albeit with a low probability. In such situations, one or more lines of compressed video data generated by video SOC 502 overflow a memory allocation sized to the width of uncompressed video data. Referring to FIG. 10, in at least one embodiment, memory 104 includes a guard band or expansion region that provides additional space for lines of compressed video data that overflow the width of uncompressed video data. In at least one embodiment of memory 104, compressed video data may run into the horizontal retrace region, the pitch region, or other expansion region of memory 104. Referring back to FIG. 5, although memory 104 is illustrated as being off-chip, in at least one embodiment of system 500, memory 104 is integrated onto video SOC 502.

In at least one embodiment of video SOC 502, memory 104 may store both compressed video data and uncompressed data. For example, video SOC 502 stores video data in a compressed format, but stores audio data in an uncompressed format. Accordingly, memory controller 520 needs to know whether to send data to a low-latency decompressor or directly to a video processor that requested the data. In at least one embodiment of video SOC 502, lines of memory 104 include a flag or tag that indicates whether the line of data is compressed or uncompressed. In at least one embodiment of video SOC 502, address ranges of memory 104 that contain compressed video data are predetermined by software or other suitable technique and stored in memory on video SOC 502. In at least one embodiment, low-latency compressor 512 implements digital watermarking, bit-robbing, or other suitable technique to indicate to the low-latency decompressor 514 whether or not a particular line of video data is in compressed format. Then, low-latency decompressor 514 can autonomously determine whether to decompress the video data or send the video data directly to a requesting video processor.

Referring back to FIG. 1, in at least one embodiment of video SOC 102, memory controller 112 is an intermediary between the video processing units (e.g., decompressor 106, video processor 108, and video processor 110) and memory 104. Memory controller 112 queues memory requests in one or more memory request buffers (e.g., FIFO) and schedules those memory requests (e.g., reads from memory 104 and writes to memory 104, respectively) by prioritizing the memory requests, translating the memory requests into a sequence of memory commands, and issuing to memory 104 the sequence of memory commands associated with a highest priority memory request.

In at least one embodiment, memory controller 112 sends or receives a number of bytes of video data written or read to or from the memory consistent with a minimum burst size in response to a write or read command, respectively. However, the minimum burst size of memory 104 can vary. In at least one embodiment, memory 104 includes DDR2 memory with a minimum burst size of 16 bytes. In at least one embodiment, memory 104 includes DDR3 memory that has a minimum burst size of 32 bytes. As memory technology develops, the minimum burst size may vary.

In at least one embodiment, memory controller 112 reorders memory requests based on the minimum burst size to increase efficiency when possible (i.e., with an acceptable latency). In at least one embodiment, memory controller 112 includes buffers sufficient to reorder memory requests to schedule together those memory requests to contiguous memory addresses. However, due to the number of requestors and the quantities of data being requested, at high data rates such reordering of writes to memory 104 may be impracticable and the resulting write commands to memory 104 are inefficient. For example, memory controller 112 stores fundamental block after fundamental block of uncompressed video data to memory 104 in contiguous memory locations. Since video processor blocks 108 and 110 read multiple lines at a time, which typically do not correspond to the number of lines in a fundamental block of video data, memory controller 112 accesses memory locations in a non-contiguous order, which increases latency of reads from memory 104.

Referring to FIG. 1 and FIG. 5, in at least one embodiment, video SOC 502 has an improved memory efficiency as compared to the memory efficiency of video SOC 102. For example, in at least one embodiment, rather than store fundamental block after fundamental block of uncompressed video data to memory 104 in contiguous memory locations, memory controller 520 receives one or more lines of compressed video data from low latency compressor 512. Accordingly, memory controller 520 writes those lines of video data such that lines of pixels of video data are stored in left-to-right, top-to-bottom order in locations having contiguous memory addresses in memory 104 (e.g., one or more entire pages of memory). In at least one embodiment, memory controller 520 is able to issue consecutive writes to memory that are to contiguous pages in memory, providing additional reduction in memory write latency as compared to video system 100. Subsequent reads of one or more lines from memory 104 by video SOC 502 are more likely to align with the minimum burst size of memory 104 and/or have an increased hit rate of row buffers of memory 104 as compared to video SOC 102. Thus, memory accesses of video SOC 502 have a reduced latency as compared to memory accesses of video SOC 102, which stores pixels of data in fundamental block order.

In addition, since in at least one embodiment video SOC 502 writes to memory having contiguous memory addresses, video SOC 502 is more insulated from changes to the burst-size of memory 104 as memory technology develops. Since video SOC 502 stores video data in memory 104 in an order consistent with the order in which video processors 108 and 110 access memory (i.e., pixels are stored in lines, i.e., left-to-right, top-to-bottom order in contiguously addressed locations in memory 104), memory latency is reduced as compared to memory latency of video processing system 100. In addition, since video data is provided in line order to video SOC 502, fewer buffers are needed by video SOC 502 to provide lines of data to the video processing blocks (e.g., low latency decompressor 514 or low latency decompressor 518, which then provide the uncompressed video data to video processor 108 and video processor 110, respectively) than for video SOC 102 to provide lines of data to the video processing blocks (e.g., video processor 108 and video processor 110). Since writes to memory are less time critical than reads from memory to feed video data consumers, any latency introduced by low-latency compressor 512 to compress and write the compressed video data in line order to memory 102 is better tolerated by video processing system 500 (i.e., less likely to impact system performance) than the latency introduced by embodiments of video processing system 100 that reorder video data after reading that video data from memory 104.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., HDL, Verilog, GDSII data) of such circuits, systems, and methods, all as described herein, and as defined in the appended claims. In addition the computer readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which video data is compressed using particular decompressors compliant with particular high-compression rate standards (HD H.264 AVC, HD VC-1, and HD MPEG2), one of skill in the art will appreciate that the teachings herein can be utilized with other video compression techniques. Variations and modifications of the embodiments disclosed herein, may be made based on the description set forth herein, without departing from the scope and spirit of the invention as set forth in the following claims.

What is claimed is:

1. A method comprising:
    decompressing first compressed video data to provide uncompressed video data in a first order, the decompressing being based on a first compression rate;
    compressing the uncompressed video data to provide second compressed video data in a second order, the compressing the uncompressed video data being based on a second compression rate, the second compressed video data being compressed using a compression technique having a latency that is less than a latency associated with the first compression rate and the second compression rate being less than the first compression rate;
    decompressing the second compressed video data based on the second compression rate to thereby generate second uncompressed video data;
    providing the second uncompressed video data to a video processor; and
    compressing processed video data generated by the video processor to provide compressed processed video data in the second order, the compressing processed video data using the compression technique and the second compression rate.

2. The method, as recited in claim 1, wherein the compressing comprises:
    compressing a first line of uncompressed video data to generate a first line of the second compressed video data, the compressing comprising:
        compressing a first portion of the first line of uncompressed video data to generate a first state of a compressor; and
        compressing a second portion of the first line of uncompressed video data based on the first state of the compressor; and
    compressing a portion of at least one other line of uncompressed video data in between the compressing of the first portion of the first line of uncompressed video data and the compressing of the second portion of the first line of uncompressed video data.

3. The method, as recited in claim 2, wherein the compressing the first line of uncompressed video data further comprises:
    saving the first state of the compressor before compressing the portion of the at least one other line of uncompressed video data; and
    restoring the first state of the compressor before compressing the second portion of the first line of uncompressed video data.

4. The method, as recited in claim 1, wherein the compressing comprises:
    alternating compression of partial portions of a first line of uncompressed video data with compression of partial portions of at least a second line of uncompressed video data to thereby generate a first line of compressed video data corresponding to the first line of uncompressed video data and at least a second line of compressed video data corresponding to the second line of uncompressed video data.

5. The method, as recited in claim 1, wherein the first order is a non-linear order and the second order is a linear order.

6. The method, as recited in claim 1, wherein the first order is based on fundamental blocks of a frame of video data and the second order is based on lines of the frame of video data.

7. The method, as recited in claim 6, wherein each fundamental block includes a P×Q block of pixels, where P is a number of line portions of the frame of video data and Q is a number of column portions of the frame of video data, the frame of video data including M×N fundamental blocks, where M is a number of rows fundamental blocks in the frame of video data and N is a number of columns of fundamental blocks in the frame of video data.

8. The method, as recited in claim 1, wherein the first compression rate is at least an order of magnitude greater than the second compression rate.

9. The method, as recited in claim 1, wherein the first compressed video data is compressed compliant with a Moving Picture Experts Group (MPEG) video compression standard and the second compressed video data is compressed using a compression technique having a latency that is orders of magnitude less than the latency of MPEG video compression.

10. The method, as recited in claim 1, further comprising:
    writing a sequence of multiple lines of second compressed video data to corresponding contiguously addressed locations in memory.

11. The method, as recited in claim 10, further comprising:
    providing to a memory controller the sequence of multiple lines of second compressed video data to be stored in the corresponding contiguously addressed locations in memory.

12. The method, as recited in claim 1, further comprising:
    storing the second compressed video data in a memory; and
    loading the second compressed video data from the memory prior to decompressing the second compressed video data.

13. The method, as recited in claim 1, further comprising:
    receiving the first compressed video data from a memory prior to decompressing first compressed video data;
    providing the second compressed video data to the memory;
    receiving the second compressed video data from the memory prior to decompressing the second compressed video data; and
    providing the compressed processed video data to the memory.

14. An apparatus comprising:
    a buffer;
    a first video data decompressor operative to decompress first compressed video data based on a first compression rate and to write uncompressed video data to the buffer in a first order;
    a video data compressor operative to read the uncompressed video data from the buffer and to provide second compressed video data in a second order based on a second compression rate;
    a second video data decompressor operative to decompress the second compressed video data based on the second compression rate and further operative to provide second uncompressed video data to a video processor, and
    a second video data compressor operative to compress processed video data received from the video processor and to provide compressed processed video data in the second order based on the second compression rate,
    wherein the second compressed video data and the compressed processed video data are each compressed using a compression technique having a latency that is less than a latency associated with the first compression rate, the second compression rate being less than the first compression rate.

15. The apparatus, as recited in claim 14, wherein the video data compressor is operative to alternate compression of partial portions of a first line of uncompressed video data with compression of partial portions of at least a second line of uncompressed video data to thereby generate a first line of compressed video data corresponding to the first line of uncompressed video data and at least a second line of compressed video data corresponding to the second line of uncompressed video data.

16. The apparatus, as recited in claim 15, wherein the video data compressor is operative to save state information of the video data compressor after compressing a first portion of the first line of uncompressed video data and operative to restore the state information to the video data compressor before compressing a second portion of the first line of the uncompressed video data.

17. The apparatus, as recited in claim 11, wherein the first order is a non-linear order and the second order is a linear order.

18. The apparatus, as recited in claim 14, wherein the first order is based on fundamental blocks of a frame of video data and the second order is based on lines of the frame of video data.

19. The apparatus, as recited in claim 14, wherein the first compression rate is at least an order of magnitude greater than the second compression rate.

20. The apparatus, as recited in claim 14, wherein the video data compressor comprises a plurality of encoders operative in parallel.

21. The apparatus, as recited in claim 14, wherein the first compressed video data is compressed compliant with a Moving Picture Experts Group (MPEG) video compression standard.

22. The apparatus, as recited in claim 14, further comprising:
a memory controller operative to receive the second compressed video data from the video data compressor and to write the second compressed video data to memory.

23. The apparatus, as recited in claim 22, wherein the memory controller is further operative to load the second compressed video data from the memory and to provide the second compressed video data to the second video data decompressor.

24. The apparatus, as recited in claim 14, further comprising:
a memory comprising an expansion portion, the memory being operative to store lines of second compressed video data or compressed processed video data larger than corresponding uncompressed lines of video data.

25. The apparatus, as recited in claim 14, further comprising:
a memory range storage element operative to store an indication of a memory range associated with second compressed video data.

26. An apparatus comprising:
means for decompressing first compressed video data to provide uncompressed video data in a first order, the decompressing being based on a first compression rate;
means for compressing the uncompressed video data to provide second compressed video data in a second order, the compressing the uncompressed video data being based on a second compression rate, the second compression rate being less than the first compression rate and associated with a latency less than a latency associated with the first compression rate; and
means for decompressing the second compressed video data based on the second compression rate and for providing second uncompressed video data to a video processor; and
means for compressing processed video data generated by the video processor to provide compressed processed video data in the second order, the compressing processed video data using the second compression rate.

27. The apparatus, as recited in claim 26, wherein the first order is based on fundamental blocks of a frame of video data and the second order is based on lines of the frame of video data.

* * * * *